US012646808B2

(12) United States Patent
Liu et al.

(10) Patent No.: US 12,646,808 B2
(45) Date of Patent: Jun. 2, 2026

(54) BUSBAR FOR HIGH CONDUCTIVITY DISTRIBUTION OF ELECTRICAL POWER WITHIN AN ELECTRIC VEHICLE

(71) Applicant: GM GLOBAL TECHNOLOGY OPERATIONS LLC, Detroit, MI (US)

(72) Inventors: Yi Liu, Troy, MI (US); Qigui Wang, Rochester Hills, MI (US); Huaxin Li, Rochester Hills, MI (US); Kestutis A. Sonta, Troy, MI (US); Daniel J. Wilson, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 602 days.

(21) Appl. No.: 18/296,416

(22) Filed: Apr. 6, 2023

(65) Prior Publication Data

US 2024/0339733 A1      Oct. 10, 2024

(51) Int. Cl.
*H01M 50/526* (2021.01)
*H01M 50/507* (2021.01)
*H01M 50/571* (2021.01)

(52) U.S. Cl.
CPC ....... *H01M 50/526* (2021.01); *H01M 50/507* (2021.01); *H01M 50/571* (2021.01); *H01M 2220/20* (2013.01)

(58) Field of Classification Search
CPC ............. H01M 50/526; H01M 50/507; H01M 50/571; H01M 2220/20; H01B 5/02; H01B 5/14
See application file for complete search history.

(56) References Cited

U.S. PATENT DOCUMENTS

| 2018/0102197 A1* | 4/2018 | Adams | H01B 13/0016 |
| 2020/0149178 A1 | 5/2020 | Ku et al. | |
| 2022/0166114 A1* | 5/2022 | Yun | H01M 10/653 |
| 2022/0255193 A1* | 8/2022 | Seon | H01M 50/503 |
| 2022/0359810 A1 | 11/2022 | Zhao et al. | |

FOREIGN PATENT DOCUMENTS

| CN | 202268177 U | * | 6/2012 | |
| KR | 20200064919 A | * | 6/2020 | H01B 1/02 |
| WO | WO-2017065530 A1 | * | 4/2017 | B01J 21/00 |

OTHER PUBLICATIONS

CN-202268177-U Translation (Year: 2012).*
KR-20200064919-A Translation (Year: 2020).*

(Continued)

*Primary Examiner* — Matthew T Martin
*Assistant Examiner* — Kevin Song
(74) *Attorney, Agent, or Firm* — Quinn IP Law

(57) ABSTRACT

A busbar for high conductivity distribution of electrical power within a power module of an electric vehicle (EV). The busbar may include a plurality of multilayer composites having copper-graphene laminations. One or more of the multilayer composite may include a first copper-graphene lamination having a plurality of graphene layers disposed between a plurality of copper layers, a second copper-graphene lamination having a plurality of graphene layers disposed between a plurality of copper layers, and a carrier substrate disposed relative to the first and second copper-graphene laminations.

20 Claims, 5 Drawing Sheets

(56)            References Cited

OTHER PUBLICATIONS

Copper Clad Steel Flat Bar, Balic Global Supplier of Grounding System Materials, Jun. 15, 2021 (Accessed by WaybackMachine) (Year: 2021).*

WO-2017065530-A1 Translation (Year: 2017).*

Shtepliuk, I.; Vagin, M.; Yakimova, R. Electrochemical Deposition of Copper on Epitaxial Graphene. Appl. Sci. 2020 (Year: 2020).*

"Enhanced Electrical Conductivity in Graphene-Copper Multilayer Composite", Chaochao Pan, Anand P.S. Gaur, Matthew Lynn, et al., AIP Advances 12, 015310, Dec. 18, 2021, 7 pages.

"Ultrahigh Electrical Conductivity of Graphene Embedded in Metals" Mu Cao, et al., Advanced Science News, Advanced Functional Materials, 2019, 8 pages.

* cited by examiner 70    94    92    96    72

90

70    102    72

100

BUSBAR FOR HIGH CONDUCTIVITY DISTRIBUTION OF ELECTRICAL POWER WITHIN AN ELECTRIC VEHICLE

INTRODUCTION

The present disclosure relates to conductors configured for high conductivity distribution of electrical power, such as but not necessarily limited to busbars configured for distributing electrical power within an electric vehicle.

An electric vehicle may be considered as a class of vehicle configured to operate based at least in part on the electrical power provided from a battery or other rechargeable energy storage system (RESS). Some of the more common types of electric vehicles rely upon the electrical power to operate an electric machine or an electric motor used in the operation thereof, such as to facilitate driving or otherwise propelling an automobile, a locomotive, a marine vessel, an airplane, etc. The operating capabilities, efficiencies, and other performance characteristics of electric vehicles may be influenced by a capability of the RESS to distribute electrical power to support driving or otherwise operating the electric vehicle.

SUMMARY

One non-limiting aspect of the present disclosure relates to a busbar configured for facilitating high conductivity distribution of electrical power within an electric vehicle (EV). The busbar may be configured in the manner described herein to include a copper-graphene composite operable for maximizing conductivity. The copper-graphene composite may provide improved conductivity relative to copper-only composites, with the improved conductivity maximizing performance of EV systems dependent on electrical conductivity while also minimizing the size, shape, and quantity of materials used for conducting electricity, which may be beneficial in reducing environmental resources consumed in the manufacturing and operation thereof.

One non-limiting aspect of the present disclosure relates to a busbar for high conductivity distribution of electrical power within a power module of an electric vehicle (EV). The busbar may include a plurality of multilayer composites, with each multilayer composite comprising a first lamination having a plurality of graphene layers disposed between a plurality of copper layers, a second lamination having a plurality of graphene layers disposed between a plurality of copper layers, and a carrier substrate disposed relative to the first and second laminations.

The busbar may include the multilayer composites arranged in a stacked configuration to form a multi-composite assembly.

The busbar may include a first corrosion resistance layer adhered to an exposed surface of a first composite of the multilayer composites and a second corrosion resistance layer adhered to an exposed surface of a second composite of the multilayer composites.

The busbar may include at least one or more intermediary composites of the multilayer composites being disposed between the first and second composites.

The busbar may include the copper layers for each multilayer composite being disposed relative to the graphene layers according to an alternatively interleaved pattern.

The busbar may include at least one copper layer for each multilayer composite being directly stacked upon one of the graphene layers.

The busbar may include the carrier substrate for each multilayer composite being thicker than either one of the first and second laminations.

The busbar may include at least one of the carrier substrates being predominantly comprised of copper foil.

The busbar may include at least one of the carrier substrates being predominantly comprised of aluminum foil.

The busbar may include each multilayer composite with the aluminum foil including a first anodized layer disposed between the aluminum foil and the first lamination and a second anodized layer disposed between the aluminum foil and the second lamination.

The busbar may include at least one of the carrier substrates being predominantly comprised of steel.

The busbar may include the graphene layers for each multilayer composite being adhered to no more than one of the copper layers.

The busbar may include the graphene layers for each multilayer composite being adhered to the copper layers according to a chemical vapor deposition (CVD) process or a plasma enhanced CVD (PECVD) process.

The busbar may include the copper layers for each multilayer composite being adhered to the graphene layers according to an electron beam deposition (EBD) process.

The busbar may include the copper layers for each multilayer composite being adhered to the graphene layers according to a copper plating process.

The busbar may include the graphene layers for each multilayer composite being directly adhered to the copper layers without use of an emulsifier.

The busbar may include the graphene layers for each multilayer composite being in direct contact with the copper layers and aligned in parallel with a direction of applied current for the busbar.

One non-limiting aspect of the present disclosure relates to a busbar for high conductivity distribution of electrical power within an electric vehicle (EV). The busbar may include a plurality of multilayer composites, with each multilayer composite including at least one lamination having a plurality of graphene layers disposed between a plurality of copper layers in an alternatively interleaved pattern and a carrier substrate disposed adhered to each lamination. The multilayer composites may be arranged in a stacked configuration to form a multi-composite assembly having high conductivity.

The busbar may include the graphene layers for each multilayer composite being aligned in parallel with a direction of applied current for the busbar.

One non-limiting aspect of the present disclosure relates to a busbar for high conductivity distribution of electrical power between terminals in an electric vehicle (EV). The busbar may include a first multilayer composite having a first lamination having a plurality of first graphene layers directly stacked upon a plurality of first copper layers in an alternatively interleaved pattern, a second lamination having a plurality of second graphene layers directly stacked upon a plurality of second copper layers in an alternatively interleaved pattern, and a first carrier substrate disposed between the first and second laminations. The busbar may include a second multilayer composite having a third lamination having a plurality of third graphene layers directly stacked upon a plurality of third copper layers in an alternatively interleaved pattern, a fourth lamination having a plurality of fourth graphene layers directly stacked upon a plurality of fourth copper layers in an alternatively interleaved pattern, and a second carrier substrate disposed between the third and fourth laminations. The busbar may include a plurality of intermediary multilayer composite disposed in a stacked pattern between the first and second multilayer composites, with each intermediary multilayer composite having a fifth lamination having a plurality of fifth graphene layers directly stacked upon a plurality of fifth copper layers in an alternatively interleaved pattern, a sixth lamination having a plurality of sixth graphene layers directly stacked upon a plurality of sixth copper layers in an alternatively interleaved pattern, and a third carrier substrate disposed between the fifth and sixth laminations. The busbar may include a first corrosion resistance layer adhered to a first exposed surface of the first composite and a second corrosion resistance layer adhered to a second exposed surface of the second composite.

The features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
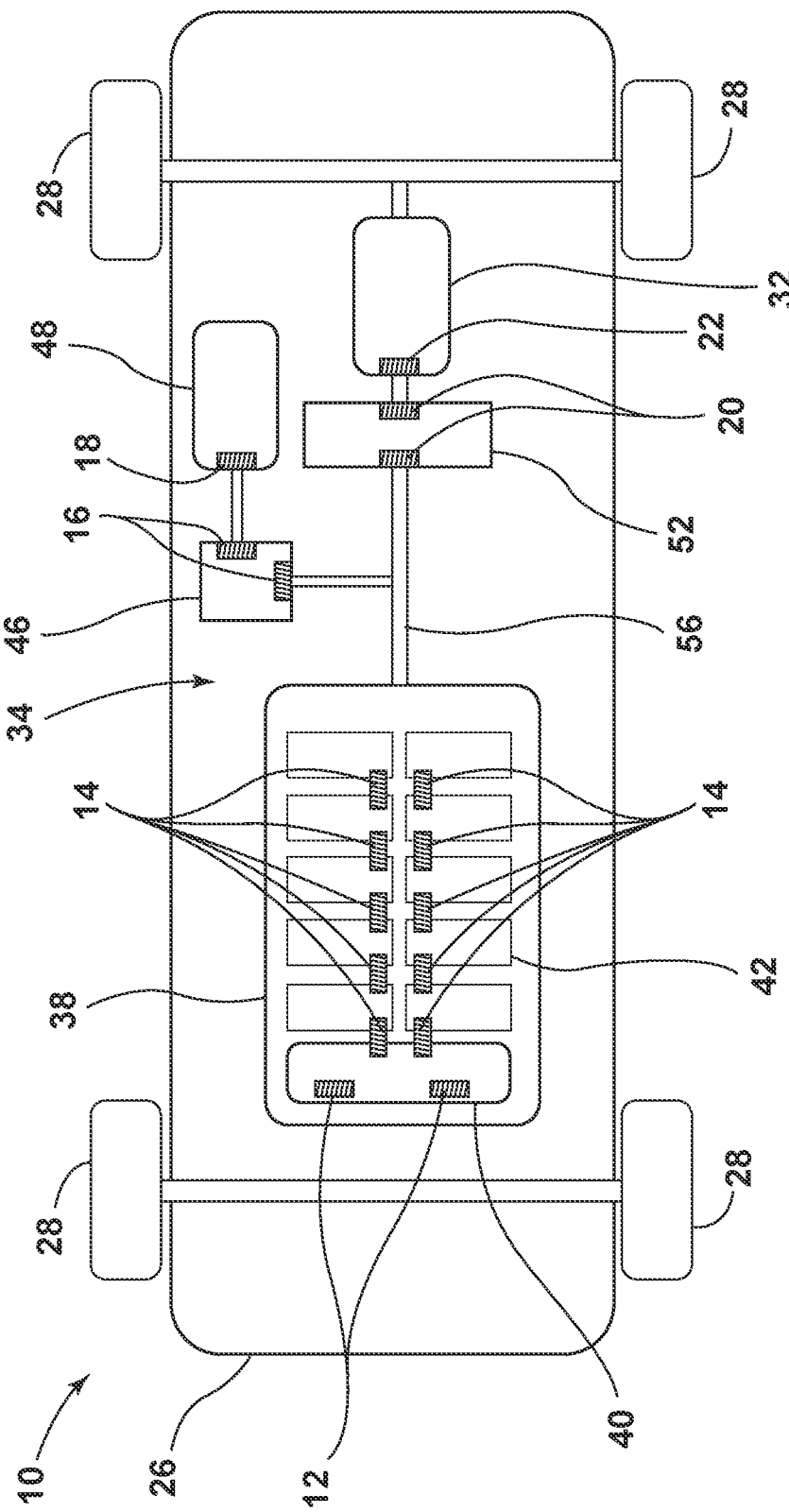
FIG. 1 illustrates a plurality of high conductivity conductors in accordance with one non-limiting aspect of the present disclosure.

FIG. 1 illustrates a high conductivity system 10 in accordance with one non-limiting aspect of the present disclosure. The system 10 may include one or more busbars 12, 14, 16, 18, 20, 22 to facilitate for high-power electrical distribution. The busbars 12, 14, 16, 18, 20, 22 may be predominately described as being incorporated within power modules and other devices typically included within an electric vehicle (EV) 26 to demonstrate the beneficial capabilities of the present disclosure to provide improved conductivity, with the improved conductivity maximizing performance of EV systems dependent on electrical conductivity while also minimizing the size, shape, and quantity of materials used for conducting electricity. The improved conductivity of the busbars 12, 14, 16, 18, 20, 22 may be beneficial in reducing environmental resources consumed in the manufacturing and operation thereof. The inclusion of the busbars 12, 14, 16, 18, 20, 22 within the electric vehicle 26 is also presented for non-limiting purposes as the present disclosure fully contemplates the busbars being included corporate and other types of devices, including a locomotive, a marine vessel, an airplane, etc.

The electric vehicle 26 is illustrated for exemplary purposes to correspond with an automobile having a plurality of wheels 28, with a portion of the wheels 28 being configured for propulsion with an electric motor 32. The electric motor 32 may be included as part of an electrical power distribution system 34 configured for at least partially relying upon electrical power being distributed from a battery pack or other rechargeable energy storage system (RESS) 38. The power distribution system 34 is shown for non-limiting purposes to include an onboard battery charger (OBCM) and/or additional control modules 40 being included as part of the RESS 38 to facilitate charging and discharging electrical power between a plurality of battery modules or cells 42. The OBCM 40 may include a plurality of OBCM busbars 12 for distributing electrical power therethrough, such as between terminals included within internal circuitry. The RESS 38 may include a plurality of cell busbars 14 for distributing electrical power between the battery cells 42.

The power distribution system 34 may include a DC-to-DC converter 46 for exchanging electrical power with one or more vehicle systems and other electrical loads 48 included onboard the vehicle 26. A plurality of converter busbars 16 may be included to facilitate distribution electric power within the DC-to-DC converter 46. One or more load busbars 18 may be included to distribute electrical power to the vehicle loads 48. The power distribution system 34 may further include an AC-to-DC converter or other driver electronics 52 for distributing and otherwise controlling electrical power consumption and operation of the electric motor 32. A plurality of converter busbars 20 may be included for distributing electrical power through the AC-to-DC converter. One or more motor busbars 22 may be included for distributing electrical power within the motor 32. A power bus 56 may be configured for distributing electrical power throughout the power distribution system 34. The power distribution system 34 is shown for exemplary purposes to include a plurality of the busbars 12, 14, 16, 18, 20, 22 configured for distributing electrical power between various modules, power modules, terminals, circuitry, etc.

Figure 2:
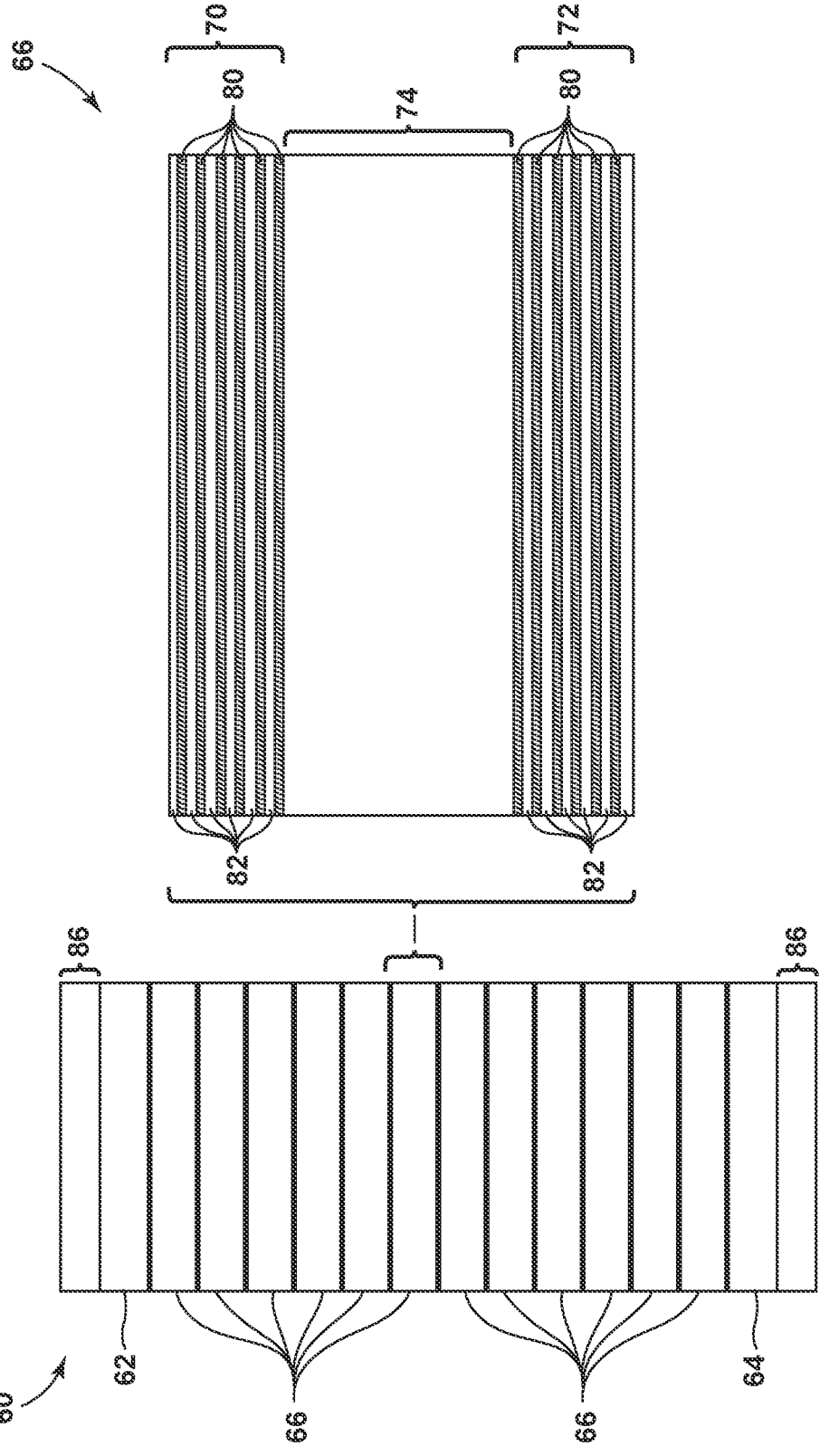
FIG. 2 illustrates a cross-sectional view of a portion of a busbar in accordance with one non-limiting aspect of the present disclosure.

One non-limiting aspect of the present disclosure contemplates the busbars 12, 14, 16, 18, 20, 22 being designated with or otherwise assigned a direction of applied current. The direction of applied may correspond with a desired direction for current to flow therethrough, e.g., the busbars 12, 14, 16, 18, 20, 22 may be sized and shaped for a particular orientation or fit relative to the components being distributed electric power therethrough, which may optionally be designed for the current to flow in a particular direction. While it may be beneficial to have current flowing in a particular direction or designed direction, the busbars 12, 14, 16, 18, 20, 22 may be operable to facilitate bi-directionally conducting electrical power. FIG. 2 illustrates schematic, cross-sectional view of a portion of an exemplary busbar 60 in accordance with one non-limiting aspect of the present disclosure. The cross-sectional view may represent a portion of an elongated busbar 60 capable of being used as or to form part of the above described busbars 12, 14, 16, 18, 20, 22. The busbar 60 may be comprised of a plurality of multilayer composites 62, 64, 66, which may be stacked one upon the other in the illustrated stacked pattern. The stacked pattern may include a first multilayer composite 62 proximate an upper portion of the busbar 60, a second multilayer composite 64 proximate a lower portion of the busbar 60, and a plurality of intermediary multilayer composites 66 stacked therebetween.

The busbar 60 is shown for non-limiting purposes with the multilayer composites 62, 64, 66 having an identical configuration, such as that corresponding with the intermediary multilayer composite 66 shown in the exploded view. The multilayer composite 66 may include one or more copper-graphene laminations 70, 72, which may correspond with a first or top lamination 70 and optionally a second or bottom lamination 72. The copper-graphene laminations 70, 72 may be configured in the manner described herein to provide high conductivity power distribution by leveraging the relatively high conductivity of graphene. The copper-graphene laminations 70, 72 may be disposed relative to a carrier substrate 74, such as in the illustrated manner on opposed sides thereof. The carrier substrate 74 is shown to be predominately comprised of a copper foil so as to provide a copper based multilayer composite 66, however, as disclosed in more detail herein, the carrier substrate 74 may be comprised partially or whole of other types of materials. The copper-graphene laminations 70, 72 may each include a plurality of graphene layers 80 disposed between a plurality of copper layers 82. The graphene layers 80 may be directly stacked upon the copper layers 82 in the illustrated, alternatively interleaved pattern such that each copper-graphene lamination 70, 72 may be comprised of, include one or more of, or consist of one or more copper layers 82 in one or more graphene layers 80.

The interleaving or stacking of the graphene layers 80 relative to the copper layers 82 such that copper may be interspersed between the graphene layers 80 may be beneficial in enhancing conductivity of the multilayer composites 70, 72 relative to the corresponding layers being comprised solely of copper. The addition of the graphene, which may be accomplished through other configurations other than the illustrated layering, may improve or add to the conductivity of the copper layers 82 to provide the enhanced conductivity configuration of the busbar 60 contemplated herein. While additional application or manufacturing processes may be employed, one non-limiting aspect of the present disclosure contemplates employing an electron beam deposition (EBD) process for adhering the copper layers 82 to the carrier substrate 74 and chemical vapor deposition (CVD) or plasma enhanced CVD (PECVD) processes to adhere the graphene layers 80 to the copper layers 82. The copper-graphene laminations 70, 72 are shown for non-limiting purposes as employing the illustrated quantity of the copper layers 82 and the graphene layers 80, however, more or less layers of differing thicknesses, optionally with variable thicknesses, may be employed depending on desired conductivity characteristics.

The busbar 60 may optionally include first and second corrosion resistance layers 86, 88 respectively adhered to exposed surfaces of the first and second multilayer composites 62, 64. The exposed surfaces may be differentiated from other surfaces sandwiched between or otherwise covered by another one of the multilayer composites 66. The corrosion resistance layers 86, 88 may be comprised of, at least partially include, or consist of a nickel-based coating. The corrosion resistance layers 86, 88 may be unnecessary and/or undesirable in some implementations, and as such, may be optionally omitted. One non-limiting aspect of the present disclosure contemplates the copper-graphene laminations 70, 72 having the graphene within the graphene layers 80 uniformly distributed and applied in direct contact with the copper of the copper layers 82 and aligned in parallel with the direction of applied current intended to pass therethrough. While flow agents or other materials may be included to facilitate adhering the copper layers 82 with the graphene layers 80 and/or adhering the copper-graphene laminations 70, 72 to the carrier substrate 74, one non-limiting aspect of the present disclosure contemplates adhering the graphene layers 80 with the copper layers 82 and/or the carrier substrate 74 without the use of emulsifiers or other agents that may introduce electrical isolation or otherwise decrease conductivity.

Figure 3:
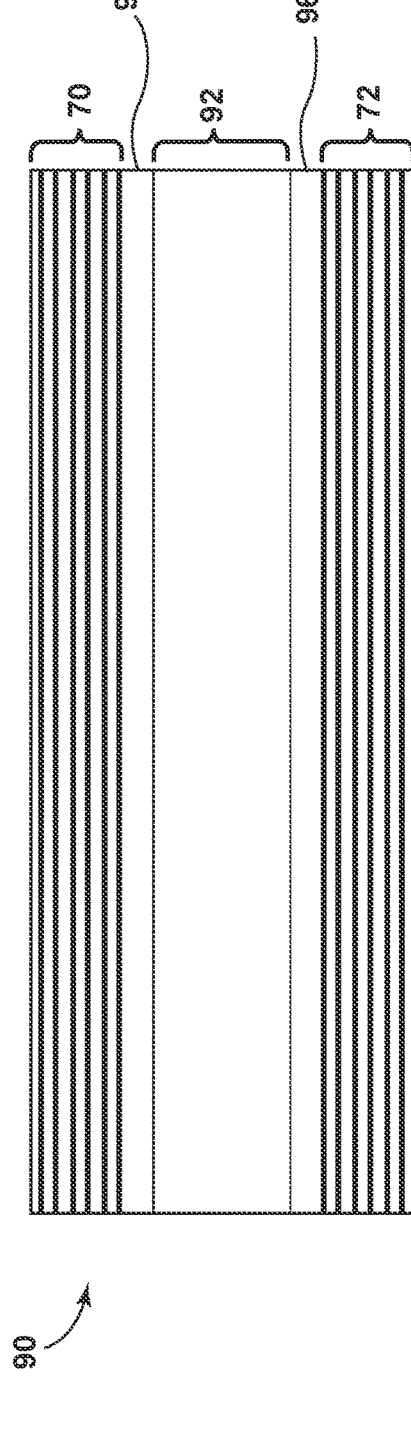
FIG. 3 illustrates an aluminum based multilayer composite in accordance with one non-limiting aspect of the present disclosure.
Figure 4:
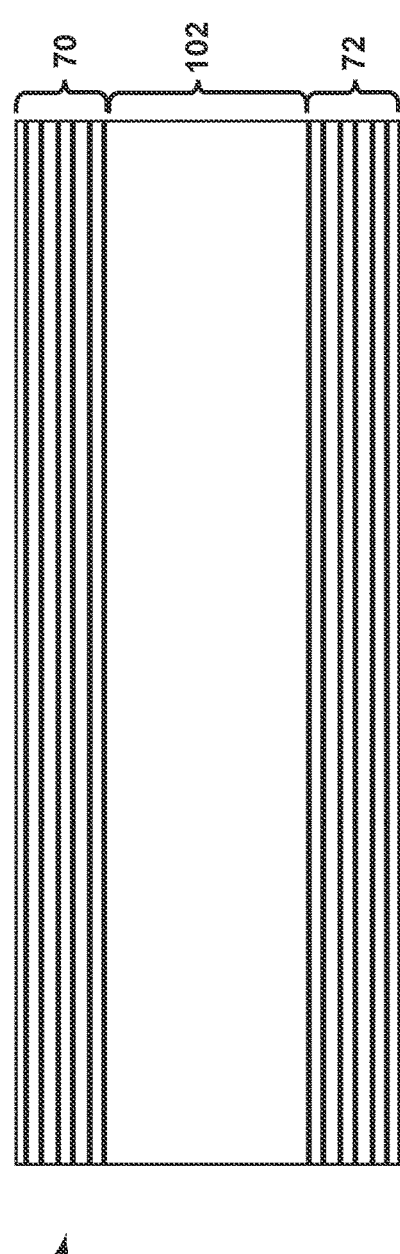
FIG. 4 illustrates a steel based multilayer composite in accordance with one non-limiting aspect of the present disclosure.

FIG. 3 illustrates an aluminum based multilayer composite 90 in accordance with one non-limiting aspect of the present disclosure. The aluminum based multilayer composite 90 may be similar to the above-described copper base multilayer composite 66 insofar as including the same type of first and second or top and bottom copper-graphene laminations 70, 72. The aluminum base multilayer composite 90 may be differentiated by including a carrier substrate 92 predominately comprised of aluminum foil. The aluminum foil may optionally be covered with or sandwiched between first and second anodized layers 94, 96. The anodized layers may provide a layer of alumina to thwart oxidation of the aluminum foil. FIG. 4 illustrates a steel based multilayer composite 100 in accordance with one non-limiting aspect of the present disclosure. The steel based multilayer composite 100 may include multiple copper-graphene laminations 70, 72 disposed relative to a substrate 102 comprised predominantly of steel or lower carbon, stainless, or other suitable steel. The aluminum and/or steel based multilayer composites 90, 100 may be beneficial over the copper base multilayer composite 66 due to the corresponding materials typically being less expensive than copper and/or due to the mechanical properties associated therewith providing structural and/or other material differences that may be advantageous in certain applications.

The busbar 60 shown in FIG. 2 is illustrated as being solely comprised of a plurality of copper base multilayer composites 66 for exemplary and non-limiting purposes as the present disclosure fully contemplates the busbar 60 being comprised entirely of one of the aluminum or steel multilayer composites 90, 100 and/or comprised of a combination of two or more of the copper, aluminum, and/or steel based multilayer composites 66, 90, 100. The multilayer composites 66, 90, 100 are shown as having an elongated configuration whereby the corresponding busbar 60 may have a longer length than width and a thickness depending on a quantity of multilayer composites stacked on top of each other. The carrier substrates 74, 92, 102 are also shown as being thicker than the copper-graphene laminations 70, 72 for non-limiting purposes as other thicknesses and arrangements thereof may be desired depending on conductivity, physical strength, etc.

Figures 5, 6, 7:
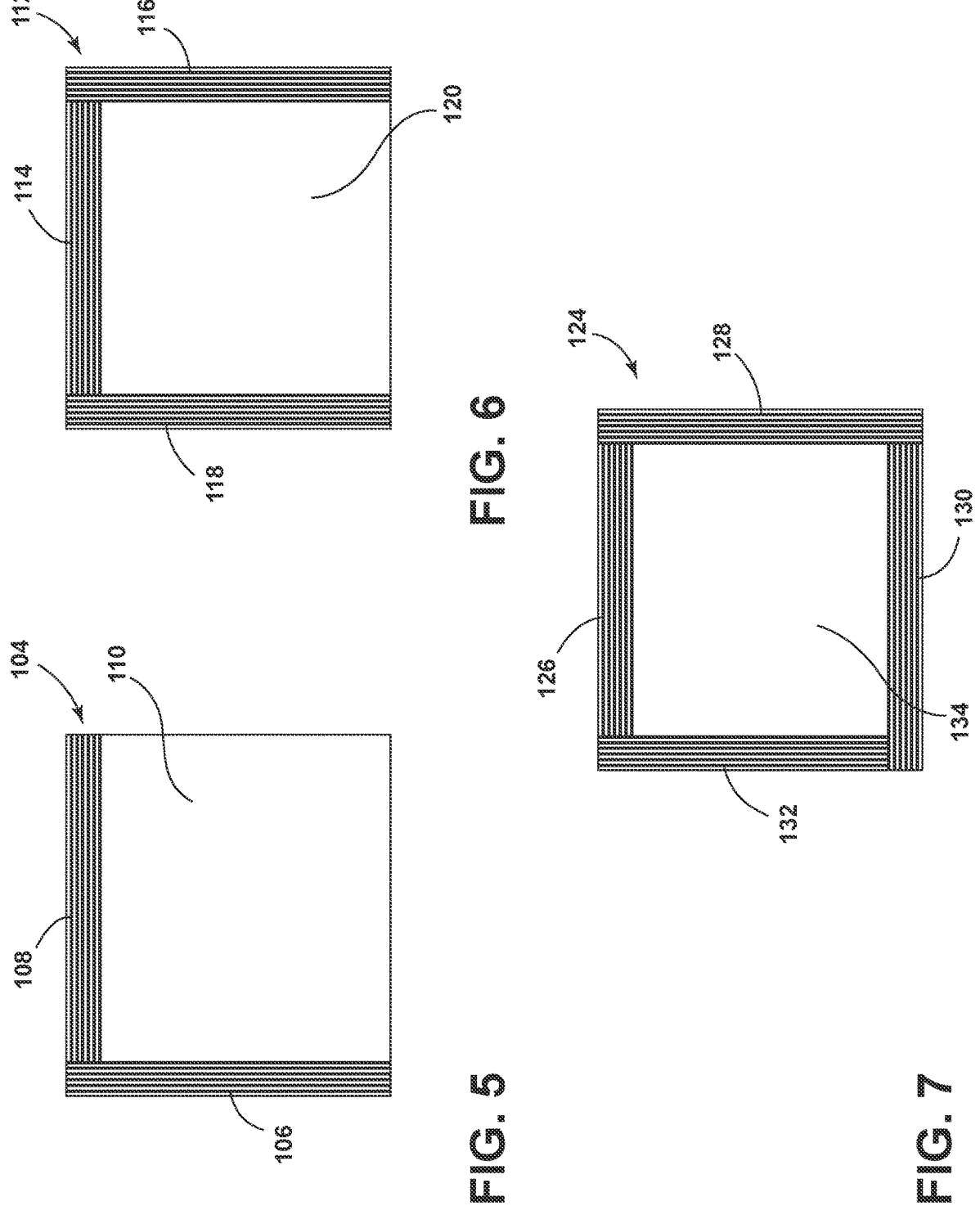
FIG. 5 illustrates an L-shaped multilayer composite in accordance with one non-limiting aspect of the present disclosure.
FIG. 6 illustrates a U-shaped multilayer composite in accordance with one non-limiting aspect of the present disclosure.
FIG. 7 illustrates a squared multilayer composite in accordance with one non-limiting aspect of the present disclosure.

FIG. 5 illustrates an L-shaped multilayer composite 104 in accordance with one non-limiting aspect of the present disclosure. The L-shaped multilayer composite 104 may include first and second copper-graphene layers 106, 108 configured to join at an edge of a carrier substrate. This configuration may be beneficial in the event a carrier substrate 110 may need to be welded to or otherwise adhered to surfaces such that it may be undesirable to have the copper-graphene laminations on opposed sides. FIG. 6 illustrates a U-shaped multilayer composite 112 in accordance with one non-limiting aspect of the present disclosure. The U-shaped multilayer composite 112 may include first, second, third copper-graphene layers 114, 116, 118 configured to joined at opposed edges of a carrier substrate 120. This configuration may be beneficial in providing more conductivity with the L-shaped multilayer composite 104. FIG. 7 illustrates a squared multilayer composite 124 in accordance with one non-limiting aspect of the present disclosure. The squared multilayer composite 124 may include first, second, third, and fourth copper-graphene layers 126, 128, 130, 132 configured to join at each edge of a carrier substrate 134. The squared multilayer composite 124 may be beneficial in providing more conductivity with the U-shaped multilayer composite 112.

Figure 8:
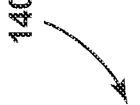
FIG. 8 illustrates a flowchart of a method for manufacturing a busbar in accordance with one non-limiting aspect of the present disclosure
Figure 8:
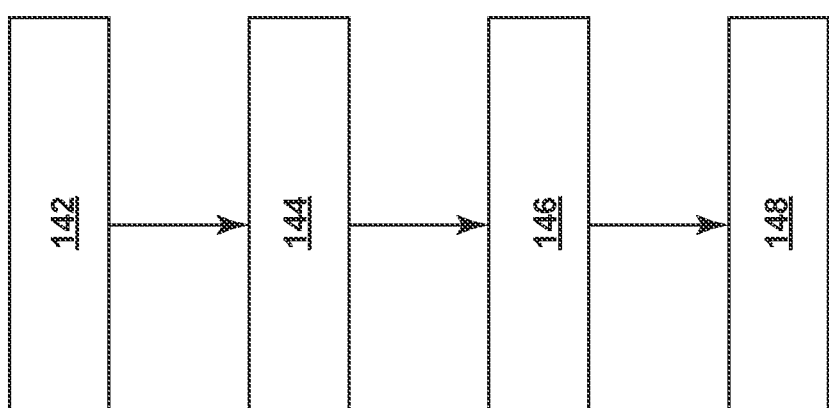

FIG. 8 illustrates a flowchart 140 of a method for manufacturing a high conductivity busbar in accordance with one non-limiting aspect of the present disclosure. Block 142 relates to a carrier process for manufacturing a carrier substrate. Block 142 relates to a lamination process for applying copper-graphene laminations to the carrier substrate to create a multilayer composite. Block 146 relates to a composite process for forming, rolling, or otherwise preparing the multilayer composite to be formed into a busbar. The composite process may be facilitated with CVD, PECVD, and/or EBD processes. Block 148 relates to an assembly process for combining or otherwise arranging the multilayer composites into a multi-composite assembly to form the busbar, such as by stacking the multilayer composites upon each other in a desired orientation. The assembly process may include preparing the multi-composite assembly into a foil, a roll, or individual pieces, optionally with incorporation of a plastic deformation process for shaping the multi-composite assembly into complex geometries and shapes.

As supported above, one non-limiting aspect of the present disclosure relates to leveraging conductivity advantages of graphene to create a copper-graphene (Cu-Gr) multilayer composite (CGMC). The CGMC may make it possible to fabricate high conductive busbars suitable for use in connecting battery modules, power inverters, battery charge controllers, DC-DC and DC-AC converters, etc. The higher electric conductivity of copper-graphene may allow for smaller busbar designs. CGMC may be made by chemical vapor deposition (CVD) and electron beam deposition (EBD) to provide high conductivity, e.g., >120% IACS, relative to the lower conductivity of just copper substrates, e.g., 100% IACS. The CGMC may optionally be disposed on one or both sides of very thin copper foil or tape. Since electron transport may occur at surface (skin effect), particularly in high frequency applications, the advantage of CGMC may be fully utilized. To save cost, the copper foil may be replaced by aluminum and mild steel foils. An $Al2O3$ layer on the aluminum foil may help to confine the electron transport within CGMC. The CGMC may be applied to produce as a busbar conductor used in EV electronics to improve electric power density.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A busbar comprising:
   a plurality of multilayer composites, each multilayer composite comprising:
      a first lamination having a plurality of first graphene layers disposed between a plurality of first copper layers;
      a second lamination having a plurality of second graphene layers disposed between a plurality of second copper layers; and a carrier substrate disposed between the first lamination and the second lamination, wherein;

the first lamination has a first inner graphene layer adjoining the carrier substrate, and a first outer copper layer opposite the first inner graphene layer; and the second lamination has a second inner graphene layer adjoining the carrier substrate, and a second outer copper layer opposite the second inner graphene layer.

2. The busbar according to claim 1, wherein:

the plurality of multilayer composites are arranged in a stacked configuration to form a multi-composite assembly.

3. The busbar according to claim 2, further comprising:

a first corrosion resistance layer adhered to a first exposed surface of a first composite of the plurality of multilayer composites; and a second corrosion resistance layer adhered to a second exposed surface of a second composite of the plurality of multilayer composites.

4. The busbar according to claim 3, wherein:

at least one or more intermediary composites of the plurality of multilayer composites are disposed between the first composite and the second composite.

5. The busbar according to claim 1, wherein:

the plurality of first copper layers are disposed relative to the plurality of first graphene layers according to an alternatively interleaved pattern.

6. The busbar according to claim 1, wherein:

at least one copper layer for each multilayer composite is directly stacked upon one of the graphene layers.

7. The busbar according to claim 6, wherein:

the carrier substrate for each multilayer composite is thicker than either one of the first laminations and the second laminations.

8. The busbar according to claim 1, wherein:

at least one of the carrier substrates is predominantly comprised of copper foil.

9. The busbar according to claim 1, wherein:

at least one of the carrier substrates is predominantly comprised of aluminum foil.

10. The busbar according to claim 1, wherein:

at least one of the carrier substrates is predominantly comprised of steel.

11. The busbar according to claim 1, wherein:

the graphene layers for each multilayer composite are adhered to the copper layers according to a chemical vapor deposition (CVD) process or a plasma enhanced CVD (PECVD) process.

12. The busbar according to claim 11, wherein:

the copper layers for each multilayer composite are adhered to the graphene layers according to electron beam deposition (EBD) process.

13. The busbar according to claim 11, wherein:

the copper layers for each multilayer composite are adhered to the graphene layers according to a copper plating process.

14. The busbar according to claim 1, wherein:

the graphene layers for each multilayer composite are in direct contact with the copper layers and aligned in parallel with a direction of applied current for the busbar.

15. A busbar comprising:

a plurality of multilayer composites, each multilayer composite comprising:

at least one lamination having a plurality of graphene layers disposed between a plurality of copper layers in an alternatively interleaved pattern; and a carrier substrate disposed adhered to each lamination; wherein:

the multilayer composites are arranged in a stacked configuration to form a multi-composite assembly having high conductivity; and the at least one lamination has an inner graphene layer adjoining the carrier substrate, and an outer copper layer opposite the inner graphene layer.

16. The busbar according to claim 15, wherein:

the plurality of graphene layers for each multilayer composite are aligned in parallel with a direction of applied current for the busbar.

17. A busbar comprising:

a first multilayer composite, comprising:

a first lamination having a plurality of first graphene layers directly stacked upon a plurality of first copper layers in an alternatively interleaved pattern;

a second lamination having a plurality of second graphene layers directly stacked upon a plurality of second copper layers in an alternatively interleaved pattern; and a first carrier substrate disposed between the first lamination and the second lamination wherein:

the first lamination has a first inner graphene layer adjoining the first carrier substrate, and a first outer copper layer opposite the first inner graphene layer; and the second lamination has a second inner graphene layer adjoining the first carrier substrate, and a second outer copper layer opposite the second inner graphene layer;

a second multilayer composite, comprising:

a third lamination having a plurality of third graphene layers directly stacked upon a plurality of third copper layers in an alternatively interleaved pattern;

a fourth lamination having a plurality of fourth graphene layers directly stacked upon a plurality of fourth copper layers in an alternatively interleaved pattern; and a second carrier substrate disposed between the third lamination and the fourth lamination;

a plurality of intermediary multilayer composites disposed in a stacked pattern between the first multiplayer composite and second the multilayer composite, each intermediary multilayer composite comprising:

a fifth lamination having a plurality of fifth graphene layers directly stacked upon a plurality of fifth copper layers in an alternatively interleaved pattern;

a sixth lamination having a plurality of sixth graphene layers directly stacked upon a plurality of sixth copper layers in an alternatively interleaved pattern; and a third carrier substrate disposed between the fifth lamination and the sixth lamination;

a first corrosion resistance layer adhered to a first exposed surface of the first composite; and a second corrosion resistance layer adhered to a second exposed surface of the second composite.

18. The busbar according to claim 1, wherein:

plurality of multilayer composites are L-shaped.

19. The busbar according to claim 1, wherein:

plurality of multilayer composites are U-shaped.

20. The busbar according to claim 1, wherein:
plurality of multilayer composites are squared-shaped
around an aperture.

\* \* \* \* \*